United States Patent

[11] 3,583,136

| [72] | Inventors | Fred W. Eisenhardt<br>610 N. University, Fargo, N. Dak. 58102;<br>Wayne S. Tonsfeldt, Sabin, Minn. 56580;<br>Hartley N. Ellingson, 610 N. University,<br>Fargo, N. Dak. 58102 |
|---|---|---|
| [21] | Appl. No. | 760,539 |
| [22] | Filed | Sept. 18, 1968 |
| [45] | Patented | June 8, 1971 |

[54] DEFOLIATOR
23 Claims, 11 Drawing Figs.

| [52] | U.S. Cl. | 56/121.43 |
|---|---|---|
| [51] | Int. Cl. | A01d 23/02 |
| [50] | Field of Search | 56/121.43, 121.4—121.46; 171/21, 22 |

[56] References Cited
UNITED STATES PATENTS

| 824,211 | 6/1906 | Sebring | 56/121.45 |
|---|---|---|---|
| 3,031,833 | 5/1962 | Nelson | 56/121.45 |
| 3,365,868 | 1/1968 | Balligand | 56/121.43 |

*Primary Examiner*—Robert Peshock
*Attorney*—Burd, Braddock & Bartz

ABSTRACT: A foliage-removing machine having power-driven rotors and power-driven crop-scalping units with cutting discs. Rigid flails mounted on the forward rotor and flexible flails mounted on the rear rotor are separated with a transverse wall carrying a downwardly directed flexible shield. Vertically adjustable connectors mount the scalping units and ground-supporting wheels at the rear of the machine. The ground wheels drive the cutting discs.

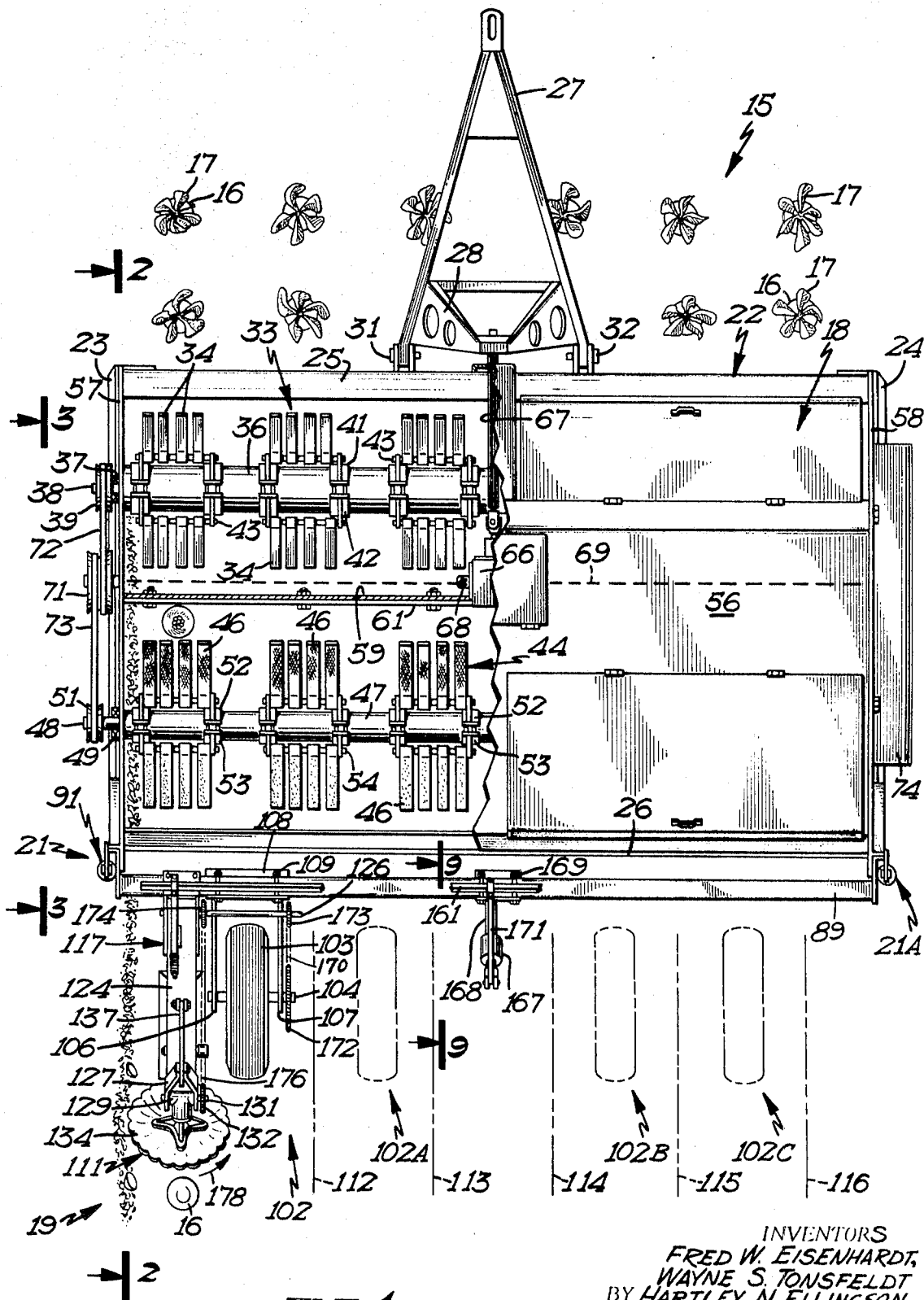

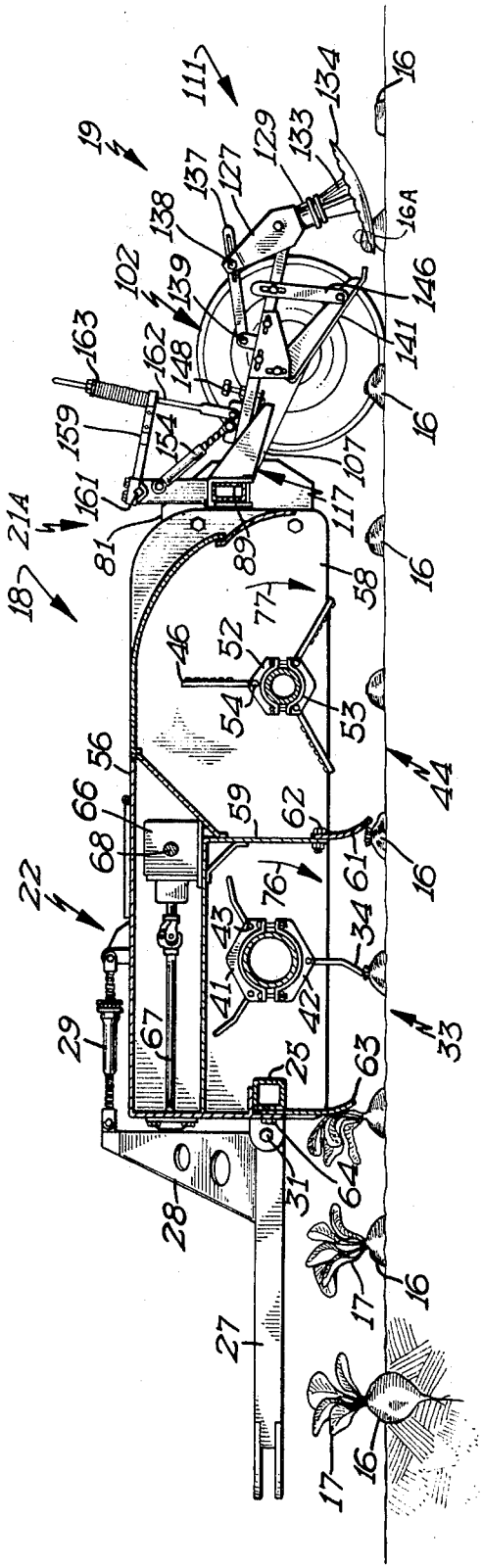

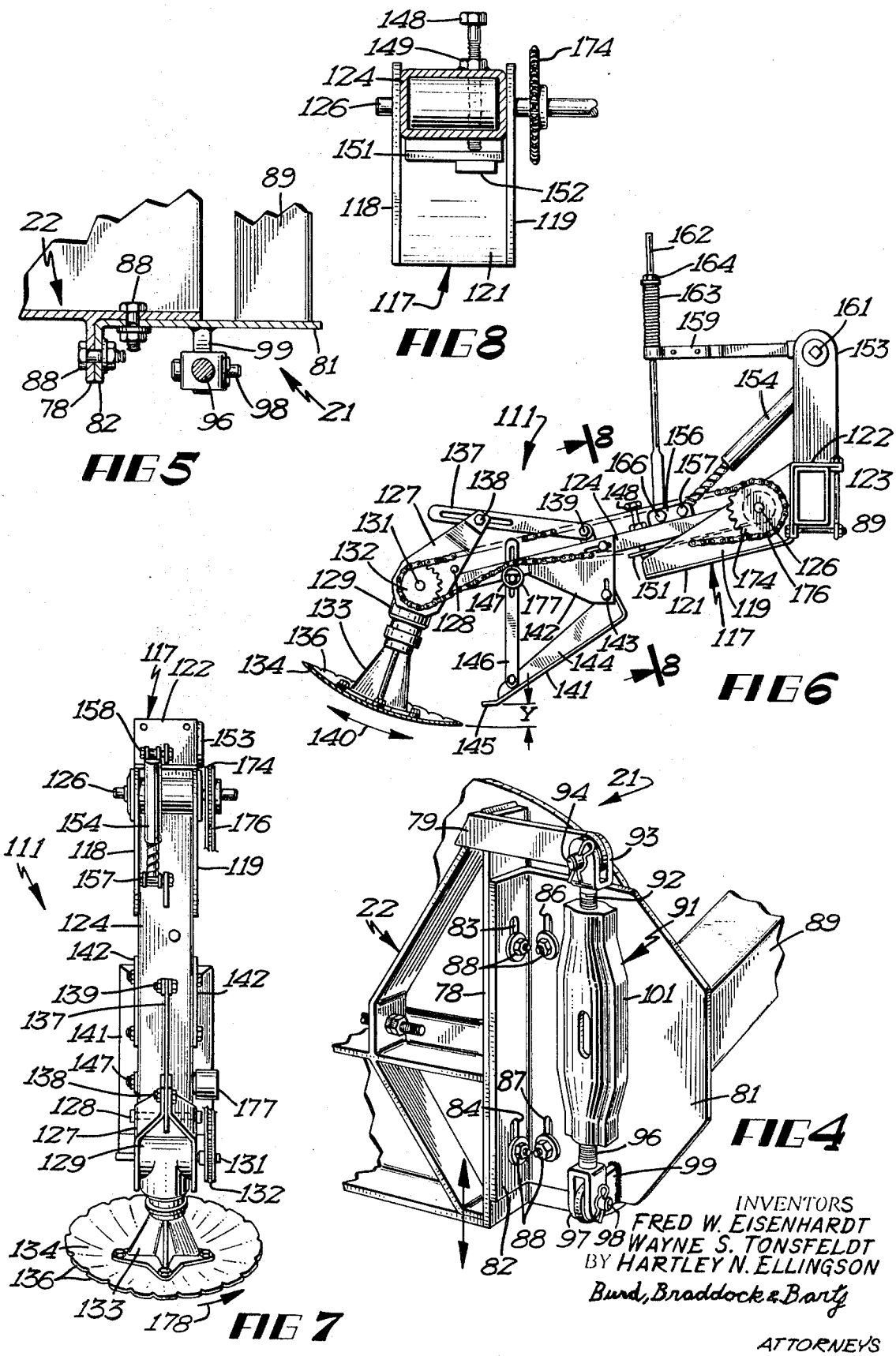

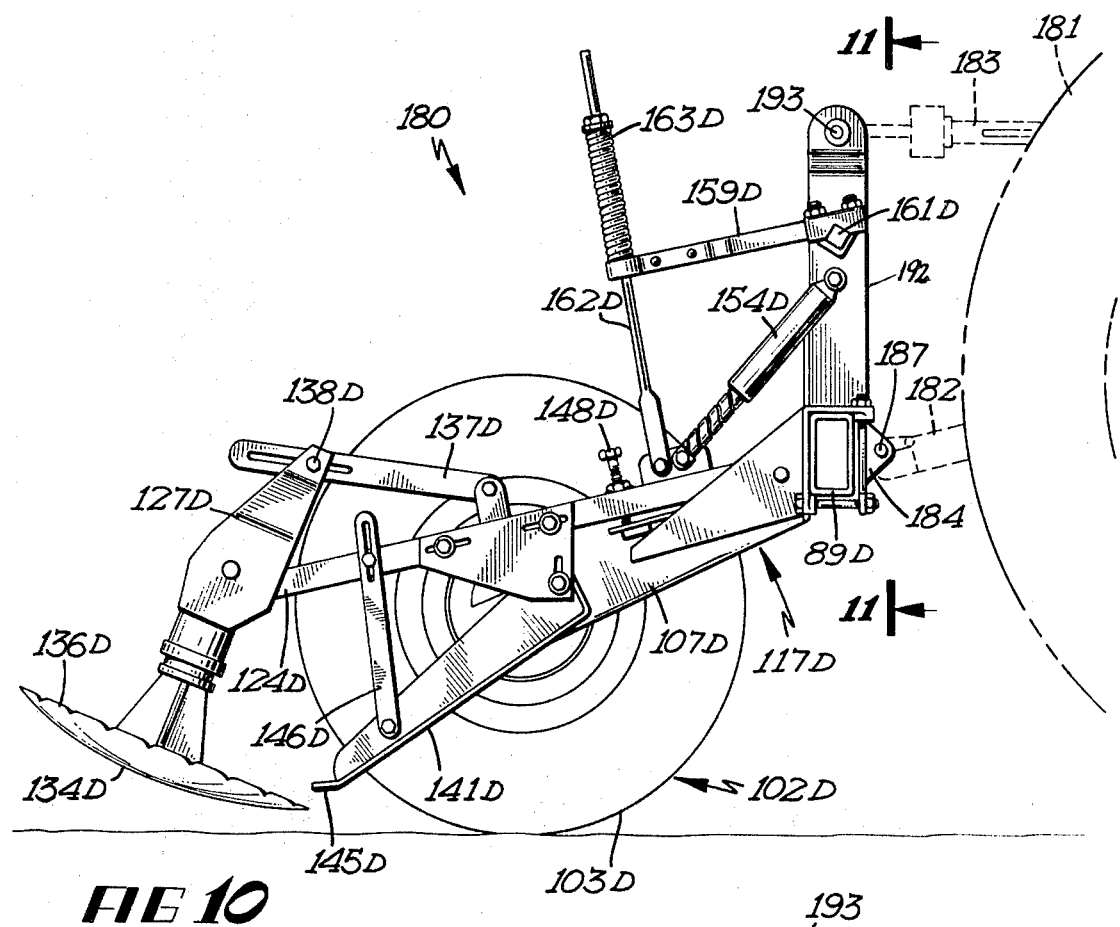
FIG 10
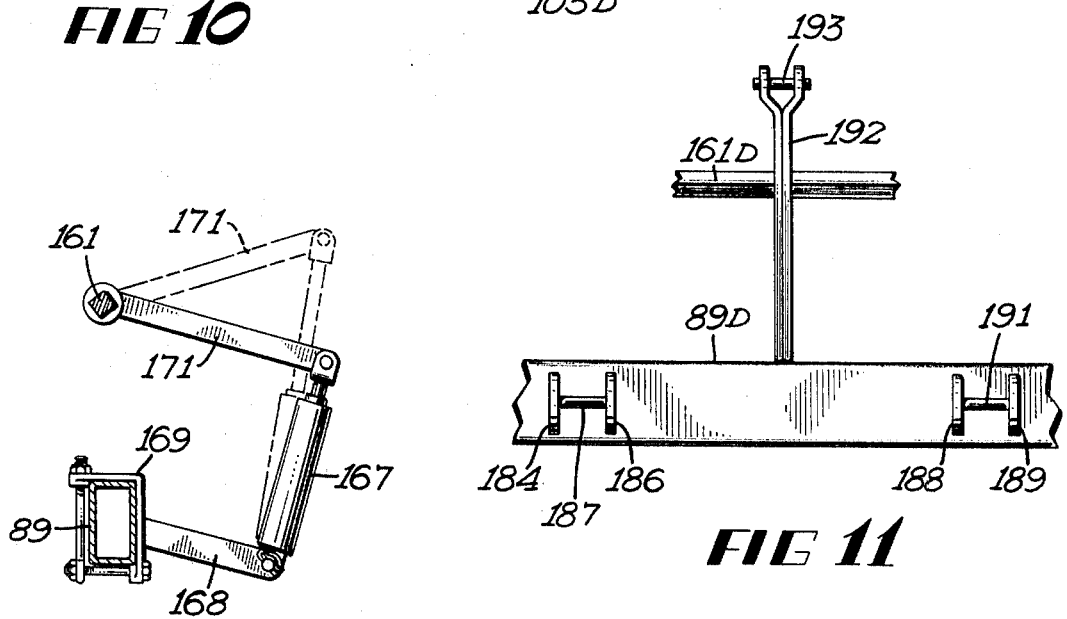
FIG 9
FIG 11
INVENTORS
FRED W. EISENHARDT,
WAYNE S. TONSFELDT
BY HARTLEY N. ELLINGSON
Burd, Braddock & Bartz
ATTORNEYS

DEFOLIATOR

SUMMARY OF THE INVENTION

The invention relates to a machine operable to remove foliage, as beet tops, leaves, weeds, potato vines, from the root crops prior to harvesting the crops. The machine has a frame and power-driven rotor means carrying foliage removing members. Located rearwardly of the rotor means is at least one scalper unit mounted on a beam. Ground-engaging wheels support the beam and adjustable connector means attach the beam to the frame whereby the frame and rotor means are vertically adjustable without changing the working position of the scalper unit.

A further feature of the invention resides in a foliage-removing machine having a forward transverse rotor-carrying rigid foliage-removing members separated from a rear transverse rotor-carrying flexible foliage-removing members with an upright divider wall and a downwardly directed flexible shield. This wall and shield functions to keep the foliage material in the area of the forward rotor until the material is cut up and broken down into relatively small pieces. The reduction of the foliage material into small pieces increases the efficiency of the rear rotor in removing more of the foliage from the crop.

Another feature of the invention is the utilization of the ground-supporting wheels for the beam to drive cutting discs forming part of the scalper units. The speed of rotation of the discs is directly related to the ground speed of the machine whereby the discs effectively cut off a top portion or crown of the crop, as a sugar beet.

Still other features of the invention include the mounting of a scalper assembly having separate scalper units driven by ground-engaging wheels on a beam attached to a vehicle, as a tractor. This scalper assembly can be used in combination with a rotor beater machine. Each scalper unit has an adjustable cutting-disc-carrying member for changing the cutting angle of the disc. Also, a shoe located forwardly of the disc can be adjusted relative to the discs to change the depth of cut of the disc.

IN THE DRAWINGS

FIG. 1 is a plan view of the foliage-removing machine with part of the housing broken away to show the rotors;

FIG. 2 is a sectional view taken along the line 2–2 of FIG. 1;

FIG. 3 is a side elevational view taken along the line 3–3 of FIG. 1;

FIG. 4 is an enlarged perspective view of the adjustable connection between the beater unit and the scalper unit;

FIG. 5 is an enlarged sectional view taken along the line 5–5 of FIG. 3;

FIG. 6 is a side elevational view of a scalper unit;

FIG. 7 is a plan view of the scalper unit of FIG. 6;

FIG. 8 is an enlarged sectional view taken along the line 8–8 of FIG. 6;

FIG. 9 is an enlarged sectional view taken along the line 9–9 of FIG. 1,

FIG. 10 is a scalper unit mounted on a tool bar connected to a three point hitch of a tractor; and FIG. 11 is an elevational view of the central section of the tool bar taken along the line 11–11 of FIG. 10.

Referring to the drawings there is shown in FIG. 1, a machine 15 for removing the foliage from tubular plants, as sugar beets and the like, in operative alignment with rows of sugar beets 16 having tops 17. Machine 15 has a beater unit indicated generally at 18 for removing the tops from the beets in a two-step operation. Located behind the beater unit 18 is a scalper assembly indicated generally at 19 operable to remove a small portion or crown of the top of the beet. An adjustable coupling indicated generally at 21 connects the scalper assembly 19 with the rear of the beater unit 18 so that the beater unit can be vertically adjusted without changing the working position of the scalper assembly. The machine is hereinafter described as operable to remove the tops from sugar beets. The machining is usable for a great variety of foliage-removing purposes including the removal of potato vines and the breaking of heavy stubble or other top growth into finely divided material to be left on the ground as mulch.

Beater unit 18 has a generally rectangular frame 22 having longitudinal side members 23 and 24, a transverse front member 25 and a transverse rear member 26 connected to opposite ends of the side members 23 and 24. Extended forwardly from the midsection of front member 25 is a tongue 27 adapted to be connected to a draft vehicle, as a tractor. Tongue 27 has a forwardly converging generally V-shape with an upright tower 28 located adjacent the beater unit 18. As shown in FIG. 2, an adjustable link 29 connects the top of the tower 28 with a top portion of frame 22. Pivotal connections 31 and 32 attach the rear ends of tongue 27 to the transverse front member 25 so that the elevation of the front of the beater unit 18 may be adjusted by changing the length of the adjustable link 29. Link 29 can be a screwjack having threaded rods connected to the tower and frame respectively joined together with a rotatable sleeve. The length of link 29 can be changed by turning the sleeve.

Located within frame 22 is a first front rotor indicated generally at 33 having a plurality of groups of foliage-removing members or flails 34. Rotor 33 comprises a transverse tube 36 extended between the side members 23 and 24. Opposite ends of the tube have outwardly directed shafts 38 rotatably mounted on bearings 37 secured to the side members 23 and 24. The outer ends of shafts 38 carry pulleys 39 used to transmit power to the tube. Mounted on the tube 36 are a plurality of pairs of collars 41 and 42 which carry pivots 43 for the foliage-removing members 34. The members 34 are pivotally mounted metal flails. As shown in FIG. 1, four flails are mounted on each pivot with three groups of flails mounted on each pair of collars. The pairs of collars are clamped to the tube whereby their position on the tube may be changed according to the distance between the rows of beets. In FIG. 1, the rotor 33 has six groups of foliage-removing members to simultaneously remove the tops from the six rows of beets.

Positioned rearwardly and parallel to the front rotor 33 is the second or rear rotor 44 having a plurality of groups of flexible foliage-removing members 46 in longitudinal alignment with the foliage-removing members 34. Rotor 44 comprises a transverse tube 47 extended between the side members 23 and 24. Stub shafts 48 projected from opposite ends of the tube are rotatably carried in bearings 49 secured to the side members 23 and 24. The outer ends of the shafts 48 carry pulleys 51 used to transmit the power to the rotor. Tube 47 carries a plurality of axially spaced groups of foliage-removing members. Each group has two pairs of collars 52 and 53 which are clamped on the tube 47 by suitable nut and bolt assemblies. Each collar carries a plurality of transverse pivots 54 for pivotally mounting the foliage-removing members or flails 46 to the collars. As shown in FIG. 1, each pivot 54 carries four flails. The flails 46 made of flexible material, as rubber or plastic are operable to clean up and remove substantially all of the tops from the beet. The flails being flexible perform a rubbing or scrubbing action which removes substantially all of the tops from the beets, as shown in FIG. 2 and 3 of the drawing.

Both the front rotor 33 and rear rotor 44 are enclosed in a housing 56 having sidewalls 57 and 58 enclosing the ends of the rotors. The housing has an open bottom providing working areas or chambers for the flails 44 and 46. The top of the housing has doors providing access openings into the chambers.

As shown in FIG. 2, housing 56 is divided with a transverse intermediate upright wall 59 located between the front rotor 33 and the rear rotor 44. The wall 59 positions each rotor in a separate transverse chamber. Located along the bottom of wall 59 is a flexible shield or guard 61 secured to the wall 59 with fasteners as nut and bolt assemblies 62. The flexible shield 61 extends the entire width of the housing and projects downwardly below the lowest cutting positions of the flails 34 and 46. The shield functions to keep the foliage material, beet tops, weeds, etc., in the area of the front rotor 33 until they are well chewed up and broken down into relatively small pieces. This reduces the bulk and volume of the cut material so that it will not clog up and reduce the efficiency of the rear rotor 44. The flexible shield 61 projects downwardly from the bottom of the housing and is normally engageable with the tops of the beets and the ground to provide maximum confinement of the material to the area of the front rotor 33.

Positioned below and parallel to the front frame member 25 is a second flexible shield or guard 63 secured to the front of the member 25 by fasteners 64. The shield 63 extends downwardly from the bottom of the housing and functions to prevent the forward throwing of material from the housing.

The rotors 33 and 44 are concurrently driven in the same direction of rotation, as shown by arrows 76 and 77 in FIG. 2, with a separate power source, as a tractor or motor which may be carried on the machine. Located in the midportion of housing 56 is a power transmission 66 having a forwardly directed power input shaft 67. The shaft 67 is adapted to be connected to the power takeoff drive of the tractor with a suitable power takeoff coupling (not shown). Power transmission 66 has oppositely directed output shafts 68 and 69 which extend through the side members 23 and 24. Mounted on the outer ends of the shafts 68 and 69 are dual pulleys 71 carrying belts 72 and 73 trained over the pulleys 79 and 51 respectively. The power is directed to opposite ends of the rotors 33 and 44 providing an even and equalized flow of power of the rotors. As shown in FIG. 3, the front rotor is driven approximately twice as fast as the rear rotor 44 with large drive pulley 71 and small driven pulley 39 on the shaft 38.

Referring to FIGS. 4 and 5, there is shown one adjustable mechanism or connector 21 for attaching the beater unit 18 to the scalper assembly 19. Connector 21A is identical to connector 21. The frame 22 of the beater unit has an upright rear member 78 carrying an upper rearwardly directed arm 79. Located adjacent the back of member 78 is a rearwardly directed upright plate 81 having an outward turned flange 82. The flange 82 and plate 81 have upper and lower pairs of upright slots 83, 84 and 86, 87 accommodating nut and bolt assemblies 88 for securing the plate 81 to the frame of the beater unit. Plate 81 extended rearwardly from the back of the beater unit is secured to a transverse horizontal beam 89 used to support the individual scalper units 111 and the ground-engaging wheel assemblies 102.

The vertical position of the frame 22 is adjusted relative to the plate 81 by an extensible and contractable link indicated generally at 91. Link 91 has an upper threaded rod 92 carrying a clevice 93. A pin 94 pivotally connects the clevice 93 to arm 79. The lower end of the link 91 has a lower threaded rod 96 carrying a clevice 97. A pin 98 projected through the clevice 97 and an ear 99 secured to the plate 81 attaches the link to the plate. Threaded rods 92 and 96 are connected together with a turn buckle 101 operable to selectively extend or contract the link 91. The adjustment of both connectors 21 and 21A changes the elevation of the rear of the frame 22 without changing the elevation of the beam 89.

As shown in FIG. 1, the beam 89 extends the entire width of the beater unit 18 and is secured at its opposite ends to a connector 21A.

Returning to FIG. 1 and 2, scalper assembly 19 has a plurality of ground-engaging wheel assemblies 102, 102A, 102B and 102C located between scalper units 111, 112, 113, 114, 115 and 116. The separate wheel assemblies and scalper units are identical in structure and function. The number of scalper units and wheel assemblies can vary according to the number of rows of beets and the width of the machine. The following description is limited to wheel assembly 102 and scalper unit 111.

Wheel assembly 102 has a ground-engaging upright wheel 103 rotatable about a transverse axis with an axle 104. Located on opposite sides of the wheel 103 are downwardly and rearwardly directed arms 106 and 107 rotatably carrying the axle 104. The forward ends of the arms 106 and 107 are secured to clamp 108 attached to transverse beam 89 with nut and bolt assemblies 109. In this manner, the wheel assembly 102 is fixedly supported on the beam 89 to carry the beam at a fixed elevation. In addition to carrying the scalper assembly 19, the wheel assemblies 102—102C support the rear of the beater unit 18 through the vertically adjustable connectors 21 and 21A. The turn buckles 101 of the connectors are rotatable to change the elevation of the beater unit to adjust the cut positions of the flails 34 and 46. The wheel assemblies 102—102C are adjustably mounted on the beam 89 so that they can be located between the rows of beets 16.

Scalper units 111—116 are located in alignment with the rows of beets 16 on opposite sides of the wheel assemblies. As shown in FIGS. 6 and 7, scalper unit 111 has a fixed support indicated generally at 117 mounted on the beam 89. Support 117 has a pair of upright sides 118 and 119 secured to a flat downwardly projected base 121. The upper ends of sides 118 and base 121 are secured to a right angle member 122 attached to the beam 89 with fasteners 123, as nut and bolt assemblies.

Projected rearwardly from the support 117 is an arm 124 connected to the sides 118 and 119 by transverse pivot axle 126. Located adjacent the rear portion of arm 124 are upright plates 127 pivotally connected to the arm 124 with a transverse pivot member 128. Located between the lower ends of plates 127 is a power transmission 129 having a transverse input shaft 131 carrying an upright sprocket 132. Transmission 129 has a downwardly directed driven or output member 133 carrying a cutting disc 134. The disc has a slight downwardly concave shape with a scalped peripheral cutting edge 136 as shown in FIG. 7.

The upper ends of plates 127 are connected to a link 137 with an adjustable fastener 138, as a nut and bolt assembly, extended through a longitudinal slot in the link 137. The forward end of the link 137 is connected with a pivot member 139 to the top of arm 124. Fastener 138 is operable to adjust the upright angle of rotation of the disc 134 as indicated by the arrow 140 in FIG. 6. In this manner, the upwardly and rearwardly directed cutting angle of the disc 134 can be changed. The cutting angle of disc 134 is shown in FIG. 6 as about 20° with respect to the ground surface. This angle can be increased or decreased as required.

Located forwardly of the disc 134 is a downwardly and rearwardly extended flat shoe 141 pivotally mounted on a pair of plates 142 secured to the sides of an intermediate portion of arm 124. Pivot members 143 connect shoe 141 to plates 142. The shoe has upright ribs 144 connecting the pivot members 143 to the flat base of the shoe 141. The rear transverse portion of shoe 141 terminates in a rearwardly directed lip 145 located above and forwardly of the front cutting edge of the disc 134. As shown in FIG. 6, a distance Y determines the depth of cut on the top of the beet. As shown in FIG. 2, the power-driven disc severs the crown or top portion 16A of the beet 16 after the tops 17 have been removed by the beater unit 18. The angular position of the shoe 141 is regulated by an adjustable link 146 attached to the arm 124 by a fastener 147. Link 146 has an elongated slot whereby the effective length of the link may be adjusted to change the angle of the shoe and the distance Y.

In addition to the shoe 141, the working position of the scalper unit 111 is determined by an adjustable stop bolt 148 threaded through a nut 149 mounted on the arm 124. As shown in FIG. 8, the bolt 148 extends through the arm 124 and engages a pivotally mounted plate 151 carrying a cushion 152. Plate 151 is located between the upright sides 118 and 119 and pivotally connected to a forward portion of the arm 124 whereby the plate may be angularly moved relative to the arm. The cushion 152 engages the bottom 121 of the fixed support 117 to limit the downward movement of the arm 124.

As shown in FIG. 6, an upright post 153 secured to the top of angle member 122 provides an anchor for a telescoping hydraulic shock absorber 154. The lower end of the shock absorber 154 is connected to a bracket 156 secured to the top of arm 124 with a pivoted member 157. As shown in FIG. 7, the upper end of the shock absorber 154 is connected to arm 153 through a bolt and bracket 158. The shock absorber 154 functions to bias the arm 124 in the downward direction and permit the arm to ride up and down against a yieldable cushioning force.

The upper end of post 153 rotatably carries a shaft 168 having a rearwardly directed lift arm 159. An upright lift rod 162 extended through a suitable hole in the outer end of lift arm 159 carries a compression spring 163. An adjusting nut 164 threaded on the upper end of rod 162 located the spring between the lift arm 159 and nut 164 to provide a yieldable cushion for the arm 124. The lower end of lift rod 162 is connected to bracket 156 with a pivot member 166.

Referring to FIG. 9, lift shaft 161 is angularly moved with a hydraulic lift cylinder 167 supported on an outwardly directed arm 168 attached to the beam 89 with an adjustable clamp 169. The upper end of the lift cylinder 167 is pivotally connected to an outwardly and rearwardly directed arm 171 secured to the shaft 161. On operation of the lift cylinder, the cylinder 167 expands as shown in broken lines to raise the arm 171 which in turn moves the lift arms 159 in an upward direction pivoting the arm 124 about the axle 126. In this manner, the scalping unit is raised to an inoperative position without raising the ground-engaging wheel assemblies 102—102C. Operation of lift cylinder 167 raises all the scalping units 111—116.

The drive mechanism for disc 134, shown in FIG. 1, has a sprocket 172 secured to the rotating axle 104. A chain 170 trained about the sprocket 172 transmits power to a second sprocket 173 mounted on the shaft 126 which pivotally mounts and drivably connects the scalper units 111, 112 and 113 to the wheel 103. A similar chain and sprocket drive connects the wheel 102C to a common drive shaft for the scalper units 114, 115 and 116. The power from the shaft 126 is transmitted through a second sprocket 174 mounted on the shaft to a chain 176 trained about the sprockets 174 and the sprocket 132 mounted on the transmission input shaft 131. In this manner, the transmission 129 connected to the disc 134 rotates the disc in the direction of the arrow 178 and allows the arm 124 to move up and down on forward travel of the machine. The return or slack side of the chain 176 rides over a tightener sleeve 177 adjustably mounted on the upper portion of the link 146. The speed of rotation of the cutting disc 134 on all of the scalper units is in direct proportion to the forward speed of the machine.

Referring to FIGS. 10 and 11, there is shown a modified scalper assembly indicated generally at 180 mounted on the rear of a tractor 181 having a three-point hitch including a pair of draft links 182 and a top control link 183. The scalper assembly 180 is identical in structure and operation of the scalper assembly 19 shown in FIG. 1. Parts of scalper assembly 180 that are identical with corresponding parts of scalper assembly 19 are identified with the same reference numerals having the suffix D. The scalper assembly 180 illustrates the separate utility of the scalper machine apart from the beater unit 18. The scalper assembly 180 is removably mounted on the draft links 182 of the tractor. The central portion of beam 89D has two pairs of spaced brackets 184, 186 and 188, 189. Horizontal pins 187 and 191 located between the brackets provide bearing members for the draft links 182. Intermediate the pairs of brackets is an upright post 192 having a horizontal top pin 193 to accommodate the control link 183. With the use of the three-point hitch the lift cylinder 167 may be eliminated since the three point hitch will lift both the wheel assemblies and scalper units to a transport position. Selective lifting of the scalper units can be accomplished by retaining the lift cylinder 167 so that the shaft 161D can be rotated to raise the arms 124D independent of the wheel assemblies 102D.

In use, the scalper assembly 180 moves longitudinally down the beet rows with the wheels 103D in engagement with the ground. The wheels drive the discs 134D in relation to the ground speed of the machine. The shoe 141D can be adjusted relative to the cutting edge 136D to vary the depth of cut on the beet. In addition, the angular position of the disc 134D can be changed by adjusting the position of the fastener 138D relative to the link 137D. The entire scalper unit can be adjusted relative to the wheel assembly 102D by the adjusting screw 148D whereby the cutting disc 134D can be held above the ground level. The shoe 141D engages the top of each beet and provides a fixed distance between the cutting edge of the power-driven disc 144D so that a certain amount of the top of each beet is removed.

In the operation of the machine 15 shown in FIG. 2, the beater unit 15 severs the tops 17 of the beets in a two-step operation from the beet or root 16. The forward rotor 33 cuts the majority of the beet tops with the rotating flails 34. The material removed from the beet is retained in the forward chamber of the housing by the flexible shield 61 until it is chewed up and broken down into relatively small pieces. The second or rear rotor 44 operates to remove the remaining portion of the beet tops from the top of the beets by a rubbing or scrubbing action of the flexible rotating flails 46. The beets remain in the ground with substantially all of the tops removed. The scalper assembly 19 operates to sever a small portion 16A of the top of each beet without removing the beet from the ground. Each scalper unit 111—116 has a power-driven rotating disc 134 which positively cuts the top 16A of each beet so that the beet will not sprout to digging, transit and storage before processing.

The elevation of the beater unit 18 may be changed without affecting the adjustment and position of the scalper assembly 19. This is achieved through the adjustable couplings 21 and 21A which are operable to selectively raise and lower the entire beater unit 18 independent of the movement of the transverse beam 89. This is accomplished by rotating the turn buckles 101 to reposition the beater frame 22 relative to the beam 89. The forward end of the beater unit 18 is moved by adjusting the length of the link 29.

The invention is defined in the following claims.

The embodiments of the invention in which I claim an exclusive property and privilege are defined as follows:

1. A machine for removing foliage from a root crop comprising: a frame, rotor means movably mounted on the frame, said rotor means including a first transverse rotor having rigid foliage-removing members and a second transverse rotor located parallel to and spaced rearwardly from the first transverse rotor, said second transverse rotor having flexible foliage removing members, power-transmitting means connected to the rotor means for transmitting power from a source of power to the rotor means, upright wall means located between the first rotor and the second rotor, transverse flexible means projected downwardly from the bottom of the wall means, at least one scalper unit located rearwardly of the rotor means, said scalper unit having a power driven member operable to cut off a top portion of the root crop, beam means supporting the scalper unit, ground-engaging wheel means connected to the beam means to support the beam means, and connector means attaching the beam means to the frame whereby the ground-engaging wheel means support the scalper unit and the frame.

2. The machine of claim 1 wherein the transverse flexible means is a flat elongated guard secured to the upright wall means.

3. The machine of claim 1 wherein the connector means includes adjustable members whereby the position of the frame relative to the beam means can be changed without changing the position of the beam means.

4. The machine of claim 3 wherein each adjustable member comprises upright plate means having upright slots, fastening means extended through the slots and connected to the frame and adjustable link means connected to the frame and the plate whereby the vertical position of the plate may be adjusted relative to the frame, said beam means being attached to the plate.

5. The machine of claim 1 wherein the power-driven member of the scalper unit is a disc rotatable about a generally upright axis and drive means for rotating said disc.

6. The machine of claim 5 wherein the drive means comprise power-transmitting means connecting the disc to the ground-engaging wheel means whereby the ground-engaging wheel means drives the disc.

7. In a machine for removing foliage from a root crop, a frame having laterally spaced side members, a first transverse rotor rotatably mounted on the side members, a said first rotor-carrying foliage-removing members, second transverse rotor mounted on the side members generally parallel to and spaced from the first transverse member, said second transverse member carrying foliage-removing members, a housing having an open bottom, sidewalls, a front wall, a rear wall and a top wall covering the first rotor and the second rotor, an upright wall means located within the housing between the first rotor and the second rotor and extended between the sidewalls, and a transverse flexible means projected downwardly from the bottom of the wall means, said flexible member positioned in a contiguous relationship with respect to the soil whereby the foliage material removed by the foliage-removing members on the first transverse rotor are broken down into relatively small pieces before they move under the transverse flexible means.

8. The machine of claim 7 wherein the transverse flexible means is a flat elongated guard secured to the upright wall.

9. The machine of claim 1 including power-transmitting means connected to the opposite ends of the first transverse rotor and the second rotor.

10. The machine of claim 9 wherein the first rotor is rotated faster than the second rotor.

11 The machine of claim 1 wherein the scalper unit includes a rearwardly directed arm pivotally connected to the beam means, a housing pivotally mounted on the arm, said power-driven member being a rotatable cutting disc operably secured to said housing, and means for adjusting the position of the housing relative to the arm whereby the angle of the disc relative to the ground surface can be adjusted.

12. The scalper assembly of claim 11 including a downwardly and rearwardly directed shoe secured to the arm forwardly of the disc.

13. The scalper assembly of claim 12 including pivot means connecting the shoe to the arm and adjustable link means connecting the shoe to the arm whereby the angle of the shoe can be changed relative to the disc.

14. The scalper assembly of claim 12 including a generally upright member rotatably mounted in said housing and secured to said disc, power transmission means located in said housing and connected to the member, and drive means connecting the power transmission means with the wheel means whereby the ground-engaging wheel means rotates the disc.

15. A scalper assembly comprising: a transverse beam, ground-engaging wheel means, rearwardly directed first arm means rigidly secured to the beam, means rotatably mounting the wheel means on the first arm means whereby the beam is supported by the wheel means above the ground, a plurality of rearwardly directed second arm means pivotally connected to the beam for movement in a generally vertical direction, power transmission means connected to the rear ends of the second arm means, rotatable cutting discs operably connected to the lower ends of the power transmission means, drive means connecting the wheel means to the power transmission means whereby the ground-engaging wheel means rotates the cutting discs.

16. The scalper assembly of claim 15 including means to angularly adjust the power transmission means on the arm whereby the cutting angle of the disc can be changed.

17. The scalper assembly of claim 15 including a fixed support attached to the beam and wherein the drive means includes a transverse shaft pivotally mounting the second arm means to the fixed support.

18. The scalper assembly of claim 15 is including fixed supports connected to the beam, means pivotally mounting the second arm means on the fixed supports, and adjustable members coacting with the fixed supports and second arm means to limit the down positions of the second arm means.

19 The machine of claim 1 including a housing having an open bottom, sidewalls, a front wall, a rear wall, and a top wall covering the first rotor and the second rotor, said upright wall means located within the housing and extended between said sidewalls.

20 The machine of claim 7 wherein the foliage-removing members on the first rotor are rigid flails and the foliage-removing members on the second rotor are flexible flails.

21. The machine of claim 20 wherein the first rotor is driven faster then the second rotor.

22. A machine for removing foliage from a root crop comprising: a generally rectangular frame, transverse rotor means rotatably mounted on the frame, said rotor means having a plurality of pivotally mounted flails for cutting a substantial portion of the foliage from a root crop, power transmitting means connected to the rotor means for transferring power from a source of power to the rotor means, a scalper assembly located rearwardly of the frame, said scalper assembly having a transverse beam, ground-engaging wheel means, means fixedly secured to the beam for connecting the wheel means, whereby the beam is supported by the wheel means above the ground, rearwardly directed arm means pivotally connected to the beam for movement in a general vertical direction, power transmission means connected to the rear end of the arm means, a rotatable cutting disc operably connected to the lower end of the power transmission means, drive means connecting the wheel means to the power transmission means, whereby the ground-engaging wheel means rotate the cutting discs, vertically adjustable connector means attaching the beam means to opposite portions of the frame, whereby the ground-engaging wheel means support the scalper assembly at a selected height and permit the raising and lowering of the generally rectangular frame without changing the position of the beam means.

23. The machine of claim 22 wherein the connector means comprise upright plate means having upright slots, fastening means extended through the slots and connected to the frame, and adjustable link means connected to the frame and the plate, whereby the vertical position of the plate may be adjusted relative to the frame, said beam means being attached to the plate.